US008508669B2

(12) United States Patent
Saijo

(10) Patent No.: US 8,508,669 B2
(45) Date of Patent: Aug. 13, 2013

(54) VIDEO SIGNAL PROCESSING APPARATUS AND VIDEO SIGNAL PROCESSING METHOD

(75) Inventor: Makoto Saijo, Kanagawa (JP)

(73) Assignee: Sony Corporation, Tokyo (JP)

( * ) Notice: Subject to any disclaimer, the term of this patent is extended or adjusted under 35 U.S.C. 154(b) by 444 days.

(21) Appl. No.: 12/610,464

(22) Filed: Nov. 2, 2009

(65) Prior Publication Data
US 2010/0110295 A1    May 6, 2010

(30) Foreign Application Priority Data

Nov. 4, 2008    (JP) ................................ P2008-283627

(51) Int. Cl.
| H04N 5/268 | (2006.01) |
| H04N 9/75  | (2006.01) |
| H04N 9/74  | (2006.01) |
| H04N 5/45  | (2006.01) |

(52) U.S. Cl.
USPC ........... 348/705; 348/592; 348/588; 348/578; 348/565

(58) Field of Classification Search
None
See application file for complete search history.

(56) References Cited

U.S. PATENT DOCUMENTS

| 5,185,666 A * | 2/1993 | Capitant et al. ............... 348/588 |
| 2003/0214605 A1* | 11/2003 | Snyder et al. .................. 348/578 |
| 2004/0218100 A1* | 11/2004 | Staker et al. ................... 348/592 |
| 2008/0062329 A1* | 3/2008 | Hio et al. ....................... 348/705 |

FOREIGN PATENT DOCUMENTS

| JP | 9 154047 | 6/1997 |
| JP | 9 233463 | 9/1997 |
| JP | 9 271021 | 10/1997 |
| JP | 2006 33380 | 2/2006 |
| JP | 2006 50144 | 2/2006 |

* cited by examiner

Primary Examiner — Jefferey Harold
Assistant Examiner — Sean Haiem
(74) Attorney, Agent, or Firm — Frommer Lawrence & Haug LLP; William S. Frommer

(57) ABSTRACT

A video signal processing apparatus includes: a plurality of input sections to each of which a video signal from an imaging apparatus whose operation is controllable or is not controllable; an input selector selecting a video signal inputted through the input sections; a screen producer producing a plurality of areas by dividing a screen into portions in which the video signals selected by the input selector are displayed, the screen producer producing a first color frame for the area for the video signal representing a primary output, a second color frame for the area for the video signal representing a standby output, and a third color identifier for the area for the video signal from the controllable imaging apparatus; and an output section outputting the video signals and the frames or the identifier to a display device that displays the screen formed of the plurality of areas.

6 Claims, 10 Drawing Sheets

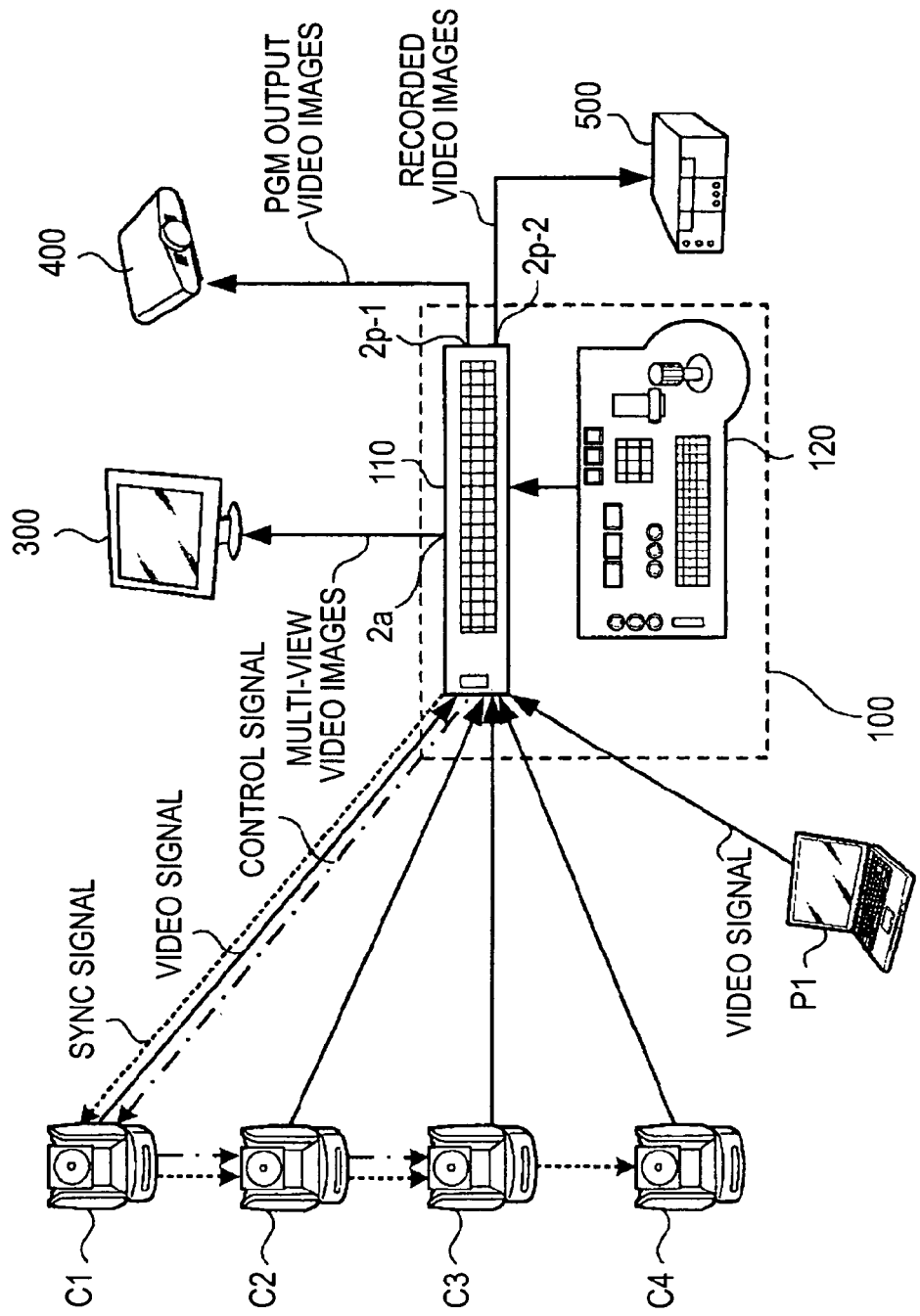

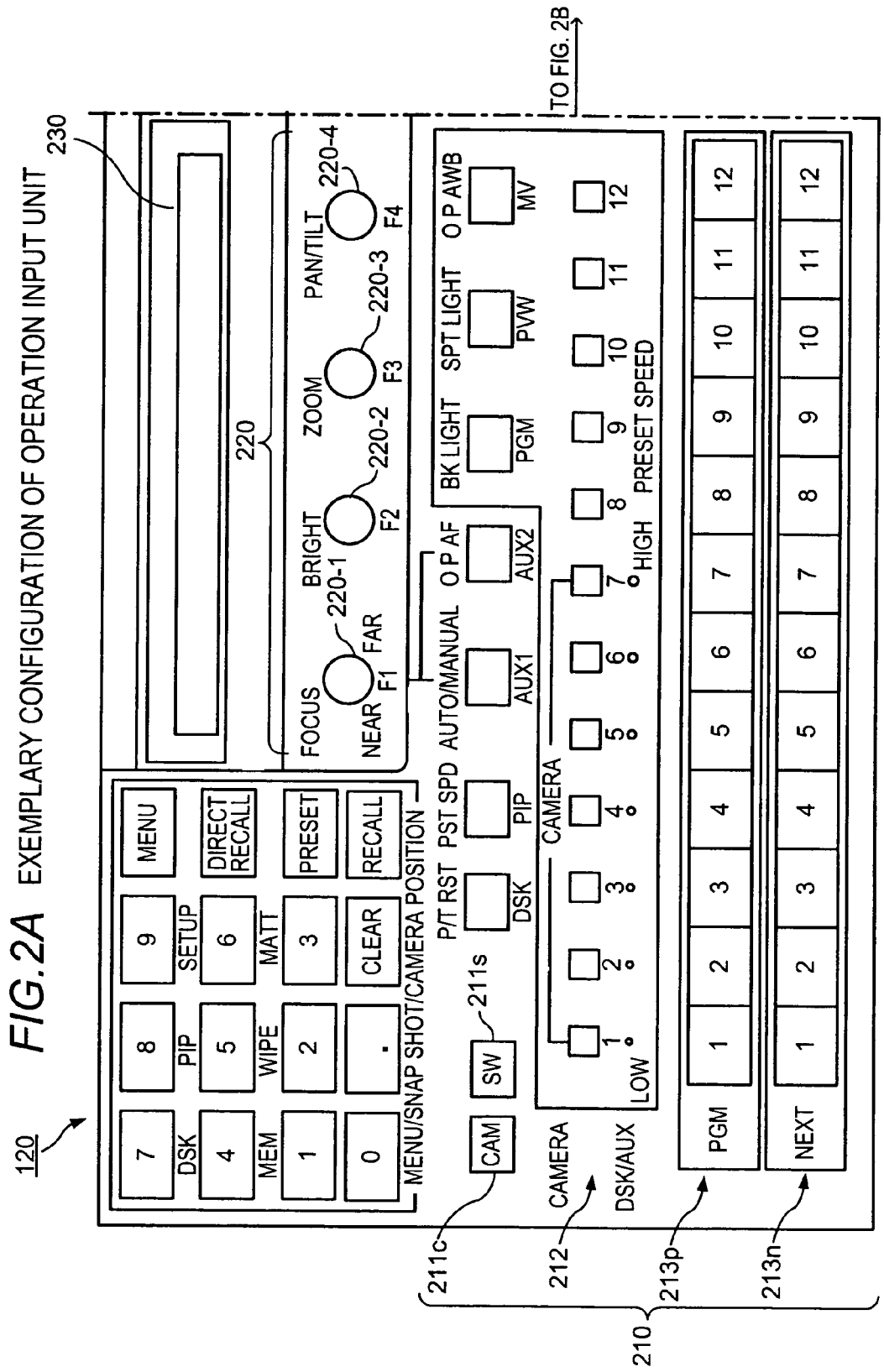
FIG. 2A EXEMPLARY CONFIGURATION OF OPERATION INPUT UNIT

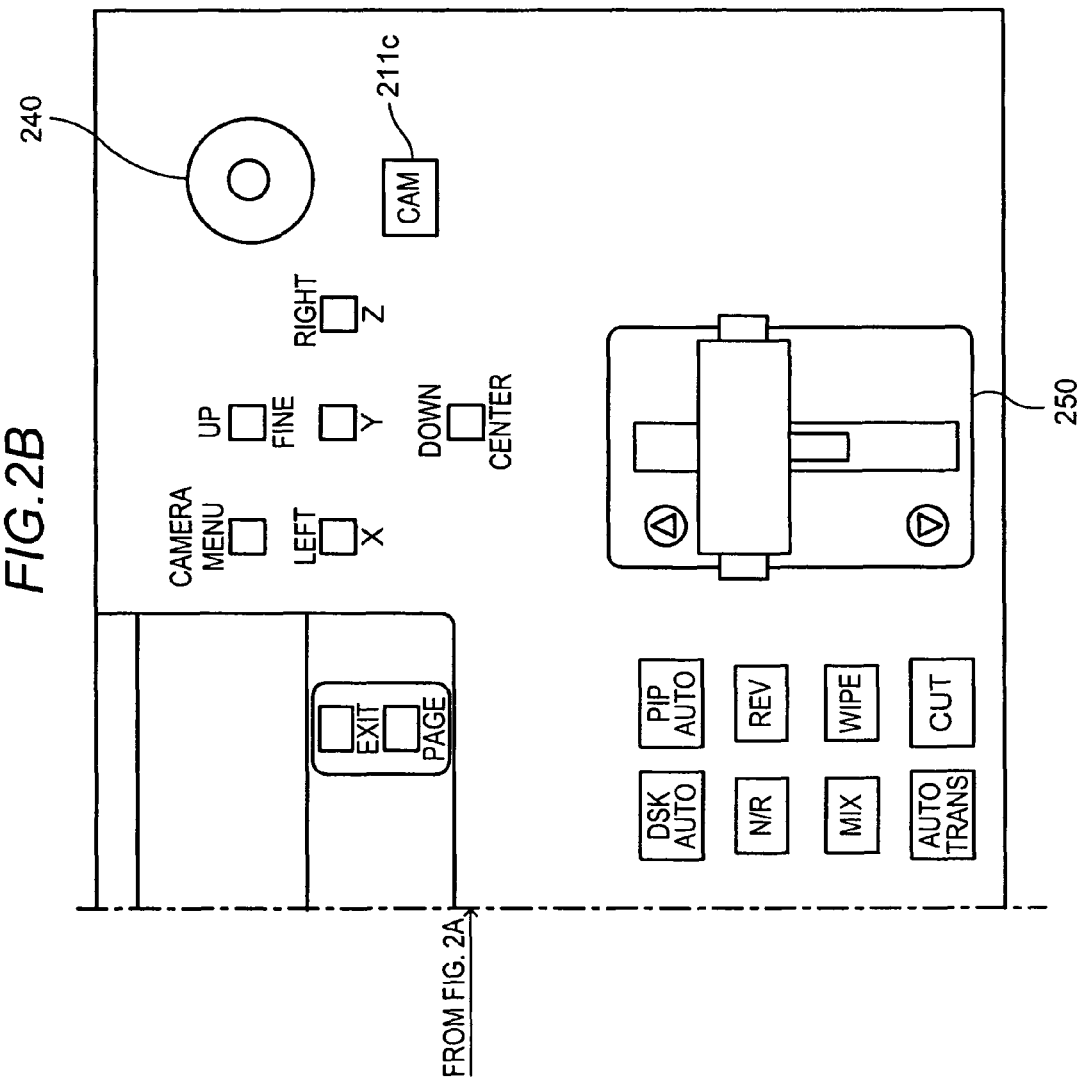

FIG.4A

| LOGICAL NUMBER | INPUT PORT NUMBER | CAMERA-UNDER-CONTROL NUMBER |
|---|---|---|
| 1 | A | 1 |
| 2 | B | 3 |
| 3 | C | — |
| ⋮ | ⋮ | ⋮ |

FIG.4B

| LOGICAL NUMBER | DISPLAY POSITION |
|---|---|
| 1 | Ar1 |
| 2 | Ar2 |
| 3 | Ar3 |
| ⋮ | ⋮ |

FIG.5A

| Ar1 | Ar2 |
|---|---|
| Ar3 | Ar4 |

FIG.5B

| Ar1 | | Ar2 | |
|---|---|---|---|
| Ar3 | Ar4 | Ar5 | Ar6 |
| Ar7 | Ar8 | Ar9 | Ar10 |

FIG.5C

| Ar1 | Ar2 | Ar3 | Ar4 |
|---|---|---|---|
| Ar5 | Ar6 | Ar7 | Ar8 |
| Ar9 | Ar10 | Ar11 | Ar12 |
| Ar13 | Ar14 | Ar15 | Ar16 |

FIG.6A

| Ar1 | Ar2 | Ar3 | Ar4 |
|-----|-----|-----|-----|
| Ar5 | Ar6 | Ar7 | Ar8 |
| Ar9 | Ar10 | Ar11 | Ar12 |
| Ar13 | Ar14 | Ar15 | Ar16 |

FIG.6B

| Ar1 | Ar2 | Ar3 | Ar4 |
|-----|-----|-----|-----|
| Ar5 | Ar6 | Ar7 | Ar8 |
| Ar9 | Ar10 | Ar11 | Ar12 |
| Ar13 | Ar14 | Ar15 | Ar16 |

VIDEO SIGNAL PROCESSING APPARATUS AND VIDEO SIGNAL PROCESSING METHOD

BACKGROUND OF THE INVENTION

1. Field of the Invention

The present invention relates to a video signal processing apparatus and a video signal processing method, and particularly to a video signal processing apparatus that functions as not only a video switcher but also a camera controller, and a video signal processing method used with the apparatus.

2. Description of the Related Art

A video switcher has been known as an apparatus that relays live images being captured by a camera and produces content based on the video images captured by the camera. More specifically, a video switcher is an apparatus that receives video signals from a plurality of channels, selects any of the video signals and outputs the selected video signal to a projector or any other destination to which video images are outputted, and exerts wiping and other effects on a video image when the video image is switched to another.

Using a video switcher also readily allows a primary output video image (PGM output video image) outputted as a current on-air video image to be switched to a standby video image (NEXT output video image, which is also referred to as preview output video image) that will next be outputted as programmed.

In this case, the video switcher also can display the PGM output video image and the NEXT output video image on a single screen at the same time so that a user can, for example, align the NEXT output video image while looking at the PGM output video image. Specifically, the single screen is divided into a plurality of areas, and the PGM output video image and the NEXT output video image are displayed in respective different areas. The display format is referred to as, for example, multi-view display.

However, the screen on which video images are displayed in the multi-view display format does not allow the user to clearly see where the PGM output video image or the NEXT output video image is displayed on the screen. To address the problem, the frame in which the PGM output video image is displayed and the frame in which the NEXT output video image is displayed are sometimes displayed in different colors. For example, JP-A-09-154047 discloses a technique in which the area in which the PGM output video image is displayed is surrounded by a red frame, whereas the area in which the NEXT output video image is displayed is surrounded by a blue frame, whereby the video images produced from the two video signals are readily visually distinguished from each other.

SUMMARY OF THE INVENTION

When a plurality of cameras are used to capture the live images described above, a camera controller that controls the operation of each of the plurality of cameras is often used as well as a video switcher. A camera controller is an apparatus that remotely performs, for example, iris, focus, and zoom control in each of the cameras connected to the camera controller.

To control the cameras through the camera controller, the user needs to look at the video images captured by the cameras under control. It is also necessary to immediately select any of the cameras under control at a necessary timing. Therefore, the video images captured by the cameras are typically displayed in the multi-view display format, as in a video switcher. The multi-view display screen should allow the user to clearly know the positions where the video images captured by the cameras under control are displayed.

However, when a PGM output video image and a NEXT output video image are displayed on the screen under the control of the video switcher, and video images captured by the cameras under control of the camera controller are also displayed on the screen, the areas in which the video images captured by the cameras are displayed may not be distinguished from the other video images. Therefore, the user himself or herself disadvantageously memorizes through his or her operations the positions on the screen where the video images captured by the cameras under control are displayed.

Thus, it is desirable to display video images captured by cameras under control of a camera controller on a screen in a multi-view display format in such a way that the display areas are readily distinguished.

A video signal processing apparatus according to an embodiment of the invention includes a plurality of input sections to each of which a video signal outputted from an imaging apparatus whose operation is controllable or a video signal outputted from an apparatus whose operation is not controllable. The video signal processing apparatus further includes an input selector selecting a video signal representing a primary output or a standby output and/or a video signal inputted from any of the controllable imaging apparatus among the plurality of video signals. A screen producer executes processing for producing a plurality of areas by dividing a screen into a plurality of portions in which the video signals selected by the input selector are displayed. The screen producer produces a first color frame for the area among the areas in which the video signal selected by the input selector as the video signal representing the primary output is displayed, and produces a second color frame for the area in which the video signal selected by the input selector as the video signal representing the standby output is displayed. On the other hand, an identifier for the area in which the video signal inputted from the controllable imaging apparatus is displayed is produced in a third color different from the first and second colors. The video signal processing apparatus further includes an output section outputting the video signals and the frames or the identifier processed in the screen producer to a display device that displays the screen formed of the plurality of divided areas.

In this way, the frame for displaying the video signal inputted from the controllable imaging apparatus is displayed in the area of interest on the screen having a plurality of areas in the third color different from those of the frames for displaying the primary output video image and the standby video image.

According to the embodiment of the invention, since the frame for displaying the video signal inputted from the controllable imaging apparatus is displayed in the third color different from those of the frames for displaying the primary output video image and the standby video image, a user can readily distinguish the video images from one another on the screen. That is, the operability of the apparatus operated by the user is improved.

BRIEF DESCRIPTION OF THE DRAWINGS

FIG. 1 is a schematic diagram showing an exemplary configuration of a system according to an embodiment of the invention;

FIG. 2 is a descriptive diagram showing an exemplary configuration of an operation input unit according to the embodiment of the invention;

FIGS. 4A and 4B are descriptive diagrams showing exemplary configurations of tables according to the embodiment of the invention, FIG. 4A showing an exemplary configuration of a logical number/input port number/camera-under-control number relationship table, and FIG. 4B showing an exemplary configuration of a logical number/screen position relationship table;

FIGS. 5A to 5C are descriptive diagrams showing examples of the configuration of a multi-view display screen according to the embodiment of the invention, FIG. 5A showing an example in which the screen is divided into four, FIG. 5B showing an example in which the screen is divided into ten, and FIG. 5C showing an example in which the screen is divided into sixteen;

FIGS. 6A and 6B are descriptive diagrams showing examples of how frames are displayed in accordance with the embodiment of the invention, FIG. 6A showing an example in which a video signal inputted from a camera under control differs from a video signal selected as a PGM output or a NEXT output, and FIG. 6B showing an example in which a video signal inputted from a camera under control coincides with a video signal selected as a PGM output or a NEXT output;

DESCRIPTION OF THE PREFERRED EMBODIMENTS

Figure 3:
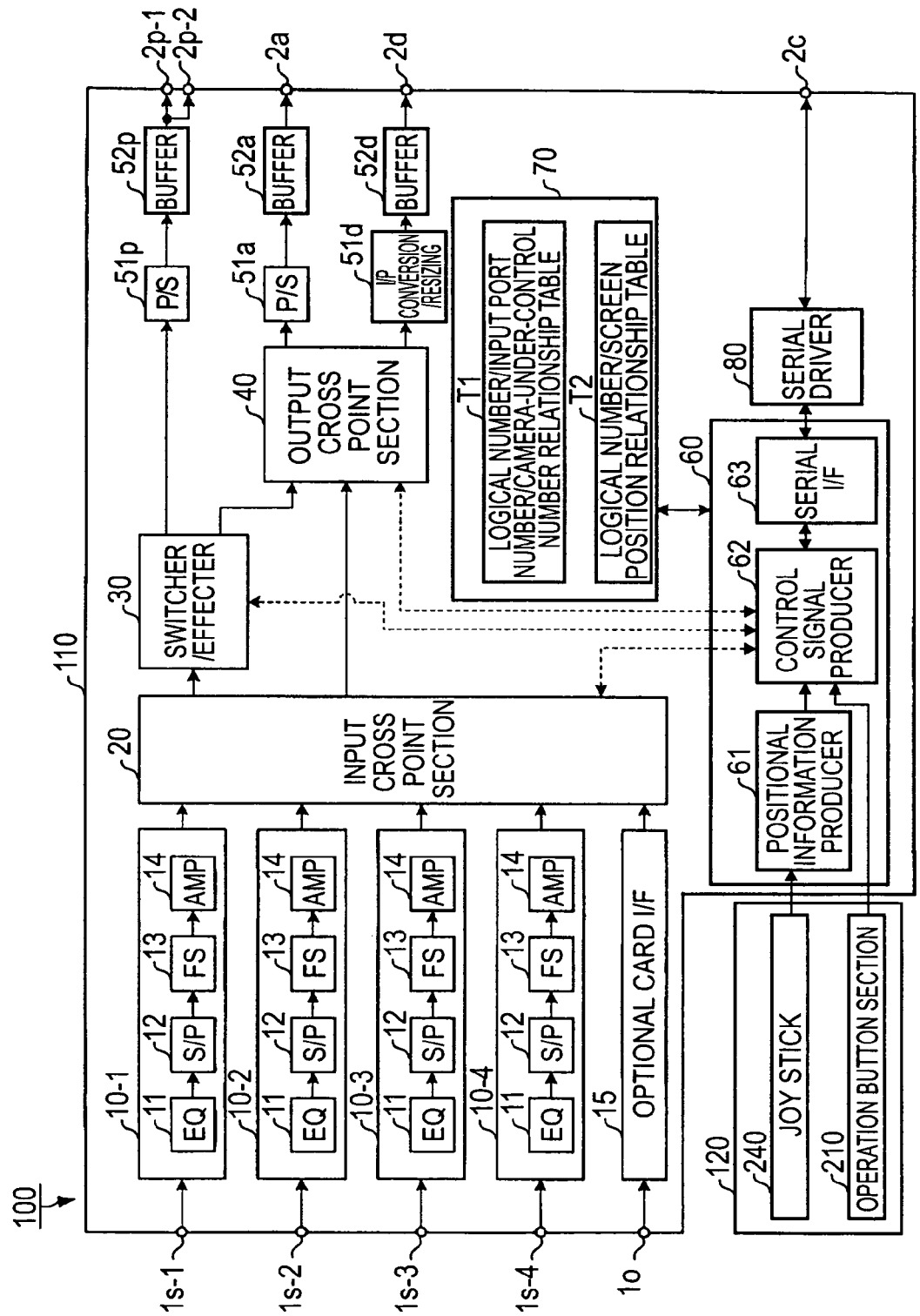
FIG. 3 is a block diagram showing an exemplary internal configuration of a video signal processing apparatus according to the embodiment of the invention.

Embodiments of the invention will be described below with reference to the accompanying drawings. The present embodiment will be described in the following order.

1. First Embodiment
2. Variations

1. First Embodiment

[Exemplary System Configuration]

FIG. 1 shows an exemplary configuration of a system according to the present embodiment. The system shown in FIG. 1 includes a video signal processing apparatus 100 having a video switcher function and a camera control function. The video signal processing apparatus 100 is formed of a main unit 110 and an operation input unit 120. While the main unit 110 and the operation input unit 120 are separate units in the present embodiment, they may be integrated with each other.

The video signal processing apparatus 100 is a portable apparatus and used to, for example, relay events that take place in a large lecture hall, a large conference room, a live concert hall, and any other similar place and produce video content that introduces how the events have proceeded.

The main unit 110 shown in FIG. 1 is connected to four cameras C1 to C4 and a personal computer (hereinafter referred to as a PC) P1 as sources from which video images are inputted.

The cameras C1 to C4 are connected to SDI (Serial Digital Interface) input terminals (not shown) or any other suitable terminals of the main unit 110, and video images captured by the cameras C1 to C4 are inputted to the main unit 110 via the respective input terminals. The video image capturing operation in the cameras C1 to C4 is synchronized with a sync signal supplied from the main unit 110.

Each of the cameras C1 to C3 is provided with a serial interface based on the VISCA® protocol to any other suitable protocol and connected to the main unit 110 via a serial cable (not shown) for transferring a control signal. That is, the main unit 110 supplies control signals (camera control commands) to the cameras C1 to C3 to control them. An ACK message or any other similar response from each of the cameras C1 to C3 is also sent over the corresponding serial cable to the main unit 110.

The camera C4 is connected to the main unit 110 via a DVI (Digital Visual Interface) cable or any other suitable cable, and video images captured by the camera C4 are transferred to the main unit 110 through a DVI input terminal (not shown). The camera C4, which does not have any terminal to which a control signal from the main unit 110 is inputted, is not controllable by the main unit 110.

The PC P1 is connected to another DVI input terminal, an RGB input terminal (not shown), or any other suitable terminal of the main unit 110 and inputs still images, motion images, or any other images stored in an HDD (Hard Disk Drive, not shown) or any other storage to the main unit 110.

The main unit 110, which has the video switcher function and the camera control function as described above, switches the output video image between a PGM output video image and a NEXT output video image in the video switcher function mode in which the main unit 110 functions as a video switcher, whereas the main unit 110 controls the cameras under control in the camera control mode in which the main unit 110 functions as a camera controller. The configuration of the main unit 110 will be described later in detail.

The main unit 110 is connected to a destination to which video images are outputted from the main unit 110, for example, a display device 300 formed of an FPD (Flat Panel Display) or any other suitable component, a projector 400, and a recording device 500 formed of an HDD or any other suitable component. In the example shown in FIG. 1, the projector 400 is connected to a PGM output terminal 2p-1 of the main unit 110, and PGM output video images are outputted to the projector 400. The display device 300 is connected to an AUX output terminal 2a of the main unit 110, and video images arranged in the multi-view display format or other images are outputted to the display device 300. The recording device 500 is connected to a PGM output terminal 2p-2 of the main unit 110, and stores a video signal outputted from the main unit 110 as recorded video images.

The operation input unit 120 connected to the main unit 110 transmits an operation signal according to an operation performed by a user to a control section, which will be described later, in the main unit 110. For example, instructions to switch video images outputted from the main unit 110 are issued from the operation input unit 120.

An exemplary configuration of the operation input unit 120 will be described with reference to FIG. 2. The operation input unit 120 shown in FIG. 2 includes an operation button section 210 formed of a variety of buttons, a dial section 220 formed of four dials, and a display section 230. The operation input unit 120 further includes a joy stick 240 and a transition lever 250.

The operation button section 210 includes a camera mode switching button 211c and a switcher mode switching button 211s as function selectors, AUX output selection/camera selection buttons 212, PGM selection buttons 213p, and NEXT selection buttons 213n.

The camera mode switching button 211c switches the mode setting in the main unit 110 from the video switcher function mode to the camera control mode. The switcher mode switching button 211s switches the mode setting from the camera control mode to the video switcher function mode. The actual mode switching operation is carried out under the control of the control section, which will be described later, when either of the switching buttons is pressed. In the present embodiment, another camera mode switching button 211c is disposed to the lower left of the joy stick 240.

The AUX output selection/camera selection buttons 212 function as AUX output selection buttons in the video switcher function mode, whereas functioning as camera selection buttons in the camera control mode. Logical numbers 1 to 12 are assigned to the AUX output selection/camera selection buttons 212. The buttons labeled with 1 to 12 are enabled when the video switcher function mode is chosen, whereas only the buttons labeled with 1 to 7 are enabled when the camera control mode is chosen.

When the AUX output selection/camera selection buttons 212 function as the AUX output selection buttons, and any of the selection buttons is pressed, a video signal inputted through the input port related in advance to the logical number assigned to the pressed button is outputted to the AUX output terminal 2a. In the example shown in FIG. 1, since the display device 300 is connected to the AUX output terminal 2a, video images inputted through the input port related to the logical number described above are displayed on the screen of the display device 300.

When the AUX output selection/camera selection buttons 212 function as the camera selection buttons, video images inputted from the camera under control that is related in advance to the logical number selected by a button pressing operation are outputted through the AUX output terminal 2a. The video images captured by the selected camera under control and outputted through the AUX output terminal 2a are displayed on the screen of the display device 300.

The PGM selection buttons 213p determine which one of the video signals inputted from the cameras C1 to C4, the PC P1, and any other apparatus connected to the main unit 110 is selected as the PGM output. The NEXT selection buttons 213n determine which one of the video signals inputted to the main unit 110 is selected as the NEXT output.

The same logical numbers 1 to 12 as those assigned to the AUX output selection/camera selection buttons 212 are also assigned to the PGM selection buttons 213p and the NEXT selection buttons 213n. For example, when any of the PGM selection buttons 213p is pressed, the video signal inputted through the input port related in advance to the logical number selected by the button pressing operation is selected as the PGM output. The PGM selection buttons 213p and the NEXT selection buttons 213n are designed to function as a video switcher irrespective of whether the video switcher function mode or the camera control mode is chosen.

The dial section 220 is formed of four dials, a dial 220-1 to a dial 220-4. When the camera control mode is chosen, the dial 220-1 functions as a dial for adjusting the focus of any of the cameras under control. The dial 220-2 functions as a dial for adjusting the brightness. The dial 220-3 functions as a dial for adjusting the zoom. The dial 220-4 functions as a dial for adjusting the pan and tilt.

When the video switcher function mode is chosen, the dials 220-1 to 220-4 function as dials for adjusting the functions assigned to functions F1 to F4.

The display section 230 is formed of a VFD (Vacuum Fluorescent Display) or any other suitable component and displays the setting of an effect exerted on a video image when the video image is switched to another, a setting menu used to set the cameras under control, and other items.

The joy stick 240 is formed of a lever supported pivotally in X-axis, Y-axis and Z-axis directions and a dial provided below the lever. When the camera control mode is chosen, the amounts of pan, tilt, and zoom control of any of the connected cameras can be specified by inclining the lever of the joy stick 240 or rotating the dial thereof. When the video switcher function mode is chosen, the on-screen position of a PinP (Picture in Picture) inserted in a PGM output video image can be determined by inclining the lever of the joy stick 240.

The transition lever 250 is an operation member shiftable in the up/down direction, and continuously changes a video image to another in accordance with the amount of shift in the up/down direction. The transition lever 250 is also designed to operate in the same manner (operate as a video switcher) irrespective of whether the video switcher function mode or the camera control mode is chosen.

An exemplary internal configuration of the main unit 110 will be described with reference to FIG. 3. In FIG. 3, the portions corresponding to those in FIGS. 1 and 2 have the same reference characters. The main unit 110 includes an SDI interface (hereinafter referred to as an I/F) 10-1 to an SDI I/F 10-4 and an optional card I/F 15 as input sections. The SDI I/F 10-1 to SDI I/F 10-4 include four respective SDI input terminals 1s-1 to 1s-4, to each of which an HD-SDI or SD-SDI signal is inputted. According to the configuration shown in FIG. 1, video signals outputted from the cameras C1 to C4 are inputted to the SDI I/F 10-1 to SDI I/F 10-4.

Each of the SDI I/F 10-1 to SDI I/F 10-4 includes an equalizer (EQ) 11, a serial/parallel converter (S/P) 12, a frame synchronizer (FS) 13, and an amplifier (AMP) 14.

The equalizer 11 shapes the waveform of an inputted HD/SD-SDI signal and supplies the signal having undergone the waveform shaping to the serial/parallel converter 12. The serial/parallel converter 12 converts the HD/SD-SDI serial signal supplied from the equalizer 11 into a parallel signal and outputs it to the frame synchronizer 13. The frame synchronizer 13 supplies the inputted parallel video signal to the amplifier 14 in synchronization with a reference sync signal in the main unit 110. The amplifier 14 amplifies the inputted video signal to an appropriate magnitude and supplies it to an input cross point section 20 as an input selector.

The optional card I/F 15 is an I/F into which an optional card is inserted. An optional card is a card that is not assembled at the time of factory shipment but adds a function that is not implemented as a standard function. A variety of optional cards are available, such as a card with an analog video signal input terminal, a card with a DVI input terminal, and a card with an HD/SD-SDI input terminal. In the main unit 110 according to the present embodiment, any two of the cards described above at the maximum can be connected to the optional card I/F 15. Therefore, a plurality of video signal terminals are present on the optional card I/F 15. FIG. 3 however collectively shows these terminals in the form of an input video terminal 1o to simplify the description.

In the configuration shown in FIG. 1, the optional card I/F 15 receives a video signal from the PC P1 connected to the terminal of an optional card inserted into the optional card I/F 15. Processing operations according to the type of the inserted card are carried out in the optional card I/F 15, which then outputs the processed video signal to the input cross point section 20. The type of the inputted video signal is not limited to those described above, but cards with other types of input terminals may be incorporated.

The input cross point section 20 selects only the video signal selected by the user through an input video image selection operation performed on the operation input unit 120 among a plurality of video signals supplied through the SDI I/F 10-1 to SDI I/F 10-4 and the optional card I/F 15, and outputs the selected video signal. For example, when the first button among the PGM selection buttons 213$p$ on the operation input unit 120 shown in FIG. 2 is pressed, the input cross point section 20 selects the video signal inputted through the input port related to the logical number 1 as the PGM output. That is, the input cross point section 20 relates the inputted video image to any of the NEXT output, the AUX output, the PinP output, the multi-view output, and any other suitable output and outputs the video image.

When the video signal selected by the input cross point section 20 needs to be processed, for example, when an effect needs to be exerted on the selected video signal, the video signal is supplied to a switcher/effecter 30 as a screen producer. The switcher/effecter 30, for example, selects an input video image and exerts an effect on a video signal.

The switcher/effecter 30 also produces a frame for displaying a PinP image and frames used in the multi-view display format. When frames used in the multi-view display format are produced, the frame for displaying a PGM output video image, the frame for displaying a NEXT output video image, and the frames for displaying video images captured by the cameras under control are produced in such a way that the colors of the frames differ from one another. The process of producing frames used in the multi-view display format will be described later in detail. Processes performed in the switcher/effecter 30 are controlled based on a control signal produced in a control section 60, which will be described later, based on an input video image selection operation performed on the operation input unit 120.

The video signal processed in the switcher/effecter 30, for example, the video signal on which an effect has been exerted, and selected as the PGM output is supplied to a parallel/serial converter 51$p$ disposed downstream of the switcher/effecter 30. The parallel/serial converter 51$p$ converts the video signal into a serial video signal and outputs it to a buffer 52$p$. The video signal inputted to the buffer 52$p$ is converted into a signal appropriate for an output operation and then outputted as the PGM output.

The video signal processed in the switcher/effecter 30, for example, the video signal on which an effect has been exerted, is also supplied to an output cross point section 40 along with the frame information and other information produced in the switcher/effecter 30. The output cross point section 40 also receives a video signal selected by the input cross point section 20 as a video signal on which no effect needs to be exerted.

The output cross point section 40 chooses either the AUX output terminal 2$a$ or a DVI output terminal 2$d$ as an output section to which the video signal supplied from the input cross point section 20 and the video signal supplied from the switcher/effecter 30 are outputted. Choosing either the AUX output terminal 2$a$ or the DVI output terminal 2$d$ as the output section is determined based on a control signal produced in the control section 60 based on an input video image selection operation performed on the operation input unit 120.

The video signal selected by the output cross point section 40 as the video signal to be outputted to the AUX output terminal 2$a$ is supplied to a parallel/serial converter 51$a$ disposed downstream of the output cross point section 40 and converted into a serial video signal. The converted serial video signal is supplied to a buffer 52$a$, where the signal is converted into a signal appropriate for an output operation and then outputted to the AUX output terminal 2$a$ as the AUX output. While the configuration in the present embodiment has only one AUX output terminal, a plurality of AUX output terminals may be provided.

The video signal selected as the video signal to be outputted to the DVI output terminal 2$d$ is supplied to an I/P (Interlace/Progressive) conversion/resizing processor 51$d$, where the video signal is converted into an interlaced or progressive video signal and the screen size is changed as necessary. The video signal having undergone the adjustment operations described above is outputted to a buffer 52$d$, where the video signal is converted into a signal appropriate for an output operation and outputted to the DVI output terminal 2$d$ as the DVI output.

The control section 60 is formed of a CPU (Central Processing Unit) and other components and produces control signals for controlling the portions in the apparatus and camera control commands for controlling the cameras under control based on a variety of types of information inputted through the operation input unit 120.

The control section 60 includes a positional information producer 61, a control signal producer 62, and a serial I/F 63. The control section 60 is connected to a memory 70 formed of an EEPROM (Electrically Erasable Programmable Read Only Memory) or any other suitable component.

The positional information producer 61 in the control section 60 receives information on the operation angle inputted from the joy stick 240 on the operation input unit 120 and information indicating on/off of each of the operation buttons that form the operation input unit 120. The positional information producer 61 produces information indicating the position of any of the cameras under control, that is, information indicating the amount of pan, tilt, and zoom control, based on the information on the inputted operation angle of the joy stick 240, and supplies the produced positional information to the control signal producer 62 disposed downstream of the positional information producer 61.

The control signal producer 62 produces a camera control command based on the information on the operation angle inputted from the joy stick 240 on the operation input unit 120 and the information on tables stored in the memory 70. The control signal producer 62 also produces control signals for controlling the portions in the main unit 110 based on the operation button on/off information inputted through the operation button section 210 and the information contained in the tables stored in the memory 70.

The tables stored in the memory 70 are a logical number/ input port number/camera-under-control number relationship table T1 and a logical number/screen position relationship table T2. FIGS. 4A and 4B show exemplary configurations of the tables. FIG. 4A shows an exemplary configuration of the logical number/input port number/camera-under-control number relationship table T1, and FIG. 4B shows an exemplary configuration of the logical number/ screen position relationship table T2.

The logical number/input port number/camera-under-control number relationship table T1 shown in FIG. 4A shows the relationship among the logical numbers assigned to some of the operation buttons, such as the PGM selection buttons 213$p$, the numbers assigned to the input ports, and the numbers assigned to the cameras under control. The numbers have been assigned to the input ports and the cameras under control in advance by menu-driven setting or any other suitable method.

In the example shown in FIG. 4A, the logical number 1 is related to the input port number A and the camera-under-control number 1. The logical number 2 is related to the input port number B and the camera-under-control number 3. The logical number 3 is related to the input port number C but is not related to any camera-under-control number, because the input port number C is connected to a camera that is not controllable by the main unit 110 (for example, the camera C4 in FIG. 1), a VTR, or any other non-camera apparatus.

The logical number-screen position relationship table T2 shown in FIG. 4B shows the relationship between the logical numbers assigned to some of the operation buttons and the positions where images are displayed on a multi-view screen. The logical number 1 is related to the display position Ar1. The logical number 2 is related to the display position Ar2. The logical number 3 is related to the display position Ar3.

The number of the divided areas and the layout thereof in the multi-view screen can be arbitrarily set, and FIGS. 5A to 5C show examples of the configuration of the multi-view screen. FIG. 5A shows an example in which the screen is divided into four. FIG. 5B shows an example in which the screen is divided into ten. FIG. 5C shows an example in which the screen is divided into sixteen. In the example shown in FIG. 5A, the thus divided areas in the screen are labeled with display positions Ar1 to Ar4. In the example shown in FIG. 5B, the divided areas are labeled with display positions Ar1 to Ar10. In the example shown in FIG. 5C, the divided areas are labeled with display positions A1 to Ar16.

The logical numbers link the logical number/input port number/camera-under-control number relationship table T1 shown in FIG. 4A to the logical number-screen position relationship table T2 shown in FIG. 4B. Therefore, there is a one-to-one relationship among the logical numbers, the input port numbers, the camera numbers, and the display positions on the multi-view display screen.

A further description will be made with reference with FIG. 3 again. The control signal producer 62 refers to the tables described above to determine an object to be controlled, produces a control signal directed to the thus determined object to be controlled based on an operation inputted through the operation input unit 120, and supplies the control signal to the object to be controlled. Specifically, the camera control command produced by the control signal producer 62 is transferred to the serial I/F 63 disposed downstream of the control signal producer 62 and converted into a serial signal by the serial I/F 63. The camera control command converted into the serial signal is outputted to a control signal output terminal 2c via a serial driver 80 and transferred to any of the cameras under control via the control signal output terminal 2c.

An example of how to display the multi-view display frames produced by the switcher/effecter 30 will be described with reference to FIGS. 6A and 6B. FIG. 6A shows an example in which the screen is divided into 16 areas, the areas Ar1 to Ar16, and images are displayed in the multi-view format. In FIG. 6A, a PGM output video image is displayed in the area Ar6. A video image captured by any of the cameras under control is displayed in the area Ar4. An NEXT output video image is displayed in the area Ar12.

The switcher/effecter 30 according to the present embodiment produces a red frame for displaying the PGM output video image, a green frame for displaying the NEXT output video image, and a yellow frame for displaying the video image captured by the camera currently under control. In this way, the PGM output video image is surrounded by the red frame, the NEXT output video image is surrounded by the green frame, and the video image captured by the camera currently under control is surrounded by the yellow frame in the multi-view display screen. In FIG. 6A, the solid line represents the red frame, and the broken line represents the green frame, and the double dashed line represents the yellow frame.

When the video signal selected by the input cross point section 20 (see FIG. 3) as the PGM output video image or the NEXT output video image is also the video signal inputted from the camera currently under control, the switcher/effecter 30 places the yellow frame inside the red or green frame. FIG. 6B shows an example of the multi-view display screen in this situation.

In FIG. 6B, the video image displayed in the area Ar6 is not only the PGM output video image but also the video image outputted from the camera currently under control, and the video image displayed in the area Ar12 is the NEXT output video image. In this case, the switcher/effecter 30 places the yellow frame inside the red or green frame, whereby the area Ar6 is surrounded by a double frame formed of the red and yellow frames.

When the yellow frame is displayed on the screen and a particular one of the AUX output selection/camera selection buttons 212 is pressed so that a camera that is not controllable is newly selected, the yellow frame currently being displayed is removed or the color of the yellow frame is changed to a fourth color, such as gray. The fourth color used herein refers to a color that allows the user to intuitively judge that the selected camera is not controllable. That is, the fourth color is not limited to gray.

[Exemplary Operation of Video Signal Processing Apparatus]

Figure 7:
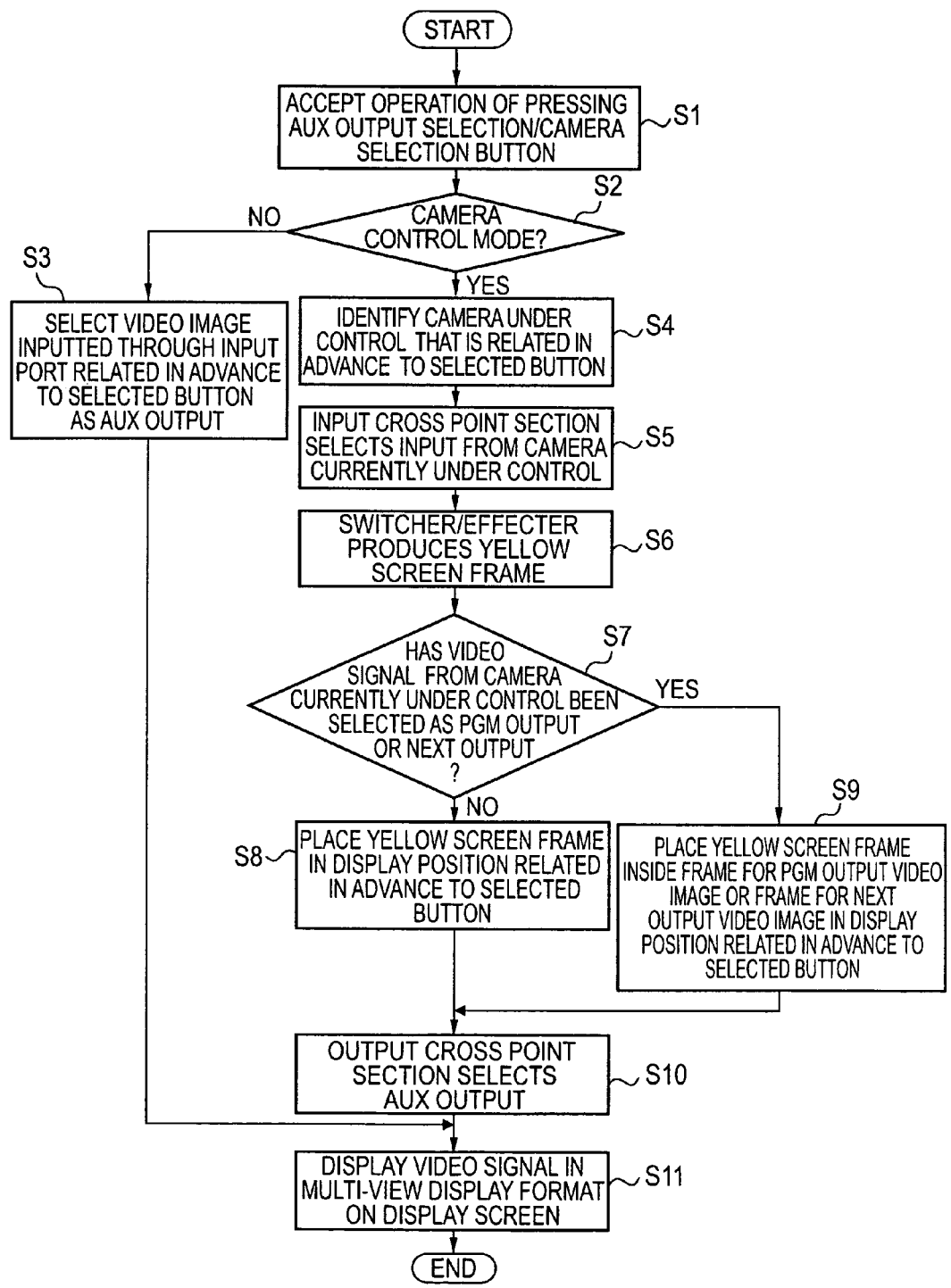
FIG. 7 is a flowchart showing an example of processes of producing display frames according to the embodiment of the invention.

An exemplary procedure of displaying the frames on a multi-view display screen will be described with reference to the flowchart in FIG. 7.

In the main unit 110, when any of the AUX output selection/camera selection buttons 212 on the operation input unit 120 is pressed (step S1), the control section 60 judges whether or not the mode of the apparatus is set to the camera control mode (step S2). When the mode of the apparatus is not set to the camera control mode but the video switcher function mode, the video signal inputted through the input port related in advance to the button selected by the pressing operation is selected as the AUX output under the control of the control section 60 (step S3).

When the mode of the apparatus is set to the camera control mode, the control section 60 identifies the camera under control that is related in advance to the button selected in the step S1 (step S4). For example, the first button of the AUX output selection/camera selection buttons 212 (see FIG. 2) is pressed, the camera labeled with the camera number 1 corresponding to the logical number 1 in the logical number/input port number/camera-under-control number relationship table T1 (see FIG. 4A) is selected.

The input cross point section 20 (see FIG. 3) then selects the video signal inputted from the camera currently under control based on a control signal supplied from the control signal producer 62 in the control section 60 (step S5). The switcher/effecter 30 (see FIG. 3) produces a yellow screen frame based on the control signal supplied from the control signal producer 62 (step S6).

It is then judged whether or not the video signal inputted from the camera currently under control has been selected as the PGM output or the NEXT output (step S7). When the video signal inputted from the camera currently under control differs from the video signal selected as the PGM output or the NEXT output, the yellow frame is placed in the screen display position related in advance to the button selected in the step S1 (step S8). That is, the control section 60 first selects the screen display position related to the logical number identified by the button pressing operation based on the contents described in the logical number-screen position relationship table T2. The yellow frame is then placed in the selected screen display position.

For example, when the first button of the AUX output selection/camera selection buttons 212 is pressed, the display position Ar1 related to the logical number 1 in the logical number-screen position relationship table T2 (see FIG. 4B) is selected. The switcher/effecter 30 then places the produced yellow frame in the screen position Ar1.

When the video signal inputted from the camera currently under control is selected also as the PGM output or the NEXT output, the yellow frame is placed inside the frame for the PGM output video image or the NEXT output video image in the screen display position related to the selected button (step S9).

The video signal processed in the step S8 or S9 is then selected as the AUX output by the output cross point section 40 (step S10). The video signal selected as the AUX output is displayed in the multi-view display format on the screen of the display device 300 connected to the AUX output terminal 2a (see FIG. 1) (step S11).

[Advantage According to Embodiment]

According to the embodiment described above, when a PGM output video image and a NEXT output video image are displayed on a multi-view display screen, a video image captured by the camera currently under control is displayed with a frame displayed in a color different from those of the frames for displaying the above video images. In this way, the user can readily know where the video image captured by the camera currently under control is displayed on the multi-view display screen.

Further, in this case, since the video image captured by the camera currently under control is enhanced by the "frame," which is similarly used to display the PGM output video image or the NEXT output video image, the sense of operation will not differ from that in related art. The user can therefore operate the apparatus as usual without any strange feeling.

Further, according to the embodiment described above, when the video signal inputted from the camera currently under control is selected also as the PGM output or the NEXT output, the video image captured by the camera currently under control is displayed inside the frame for displaying the PGM output video image or the NEXT output video image. In this case as well, since the frame for displaying the video image captured by the camera currently under control is displayed in a color different from that of the frame for displaying the PGM output video image or the NEXT output video image, the user can readily identify where the video image captured by the camera currently under control is displayed. The user can also recognize at a glance that the video image captured by the camera currently under control is selected also as the PGM output or the NEXT output.

2. Variations

The above embodiment has been described with reference to the case where the switcher/effecter 30 produces screen frames and then the output cross point section 40 displays in the multi-view format a video signal into which the screen frames are incorporated. However, the order in which the processes are carried out is not limited to the order described above. For example, the video signal may first be displayed in the multi-view display format, and then the screen frames may be added to the video signal, which forms divided areas of the screen. In this case, the output cross point section 40 also needs to control the screen frames.

While in the embodiment described above, the frame for displaying a video image captured by the camera currently under control is displayed in yellow, the color of the frame is not limited to yellow. The color may be any third color different from the color of the frame for displaying a PGM output video image and the color of the frame for displaying a NEXT output video image. Further, when a double frame is produced, the frame for displaying a video image captured by the camera currently under control may be placed outside the other frame. Alternatively, instead of producing a double frame, a single frame displayed in two colors, for example, by alternately arranging the two colors in stripes may be produced.

Figure 8:
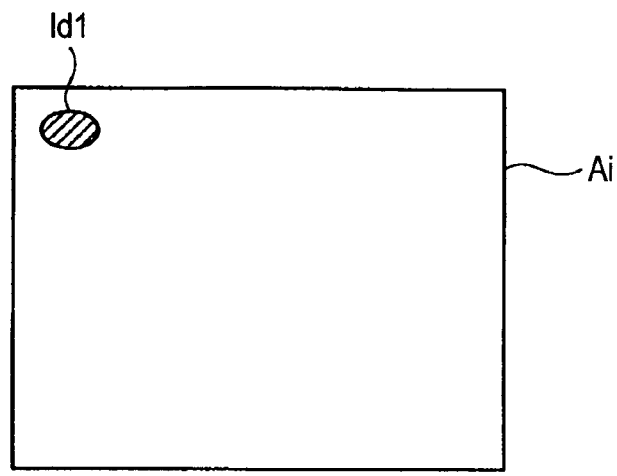
FIG. 8 is a descriptive diagram showing an example in which a marker is displayed as an identifier according to an embodiment of the invention.

A video image captured by the camera currently under control may be made clearer by displaying a marker or any other suitable object instead of a frame. FIG. 8 shows an example in which an elliptical marker is used. FIG. 8 shows a case where an elliptical identifier Id1 indicating that the video image displayed in a display area Ari (i is a natural number) is a video image captured by the camera currently under control is placed in the upper left corner of the screen. The position where the identifier Id1 is placed is not limited to the upper left corner, but may be, for example, the lower left corner, the upper right corner, or the lower right corner (any of the four corners of the screen). The position where the marker is placed may be arbitrarily specified by the system, or may be freely set by the user.

Figure 9A:
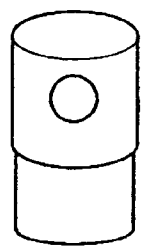
FIGS. 9A to 9D are descriptive diagrams showing examples of the marker according to another embodiment of the invention.
Figure 9B:
Figure 9C:
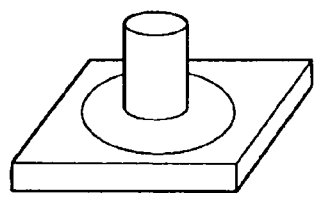

FIGS. 9A to 9D show examples in which a camera icon, a joy stick icon, and other objects are used as the marker. The icon shown in FIG. 9A represents a camera by using two cylinders and a circular mark. The icon shown in FIG. 9B represents a camera by using a rectangle and two oblique lines. The camera represented by the icon in FIG. 9B may be oriented rightward or leftward. FIG. 9C is a simplified diagram showing an icon representing the joy stick 240 for operating the cameras. The icons shown in FIGS. 9A to 9D are presented by way of example, and the shapes of the icons are not limited thereto. Icons having other shapes may be used as long as they can explicitly show that a video image captured by the camera currently under control is selected.

Figure 9D:

Alternatively, as shown in FIG. 9D, "CAM CONTROL" or other characters may be used as an identifier. The format used to display characters may be formed of a single row as shown in the left part of FIG. 9D or may be formed of two rows as shown in the right part of FIG. 9D. The characters themselves may differ from those shown in FIG. 9D as long as they show that a video image inputted from the camera currently under control is selected.

Figure 10:
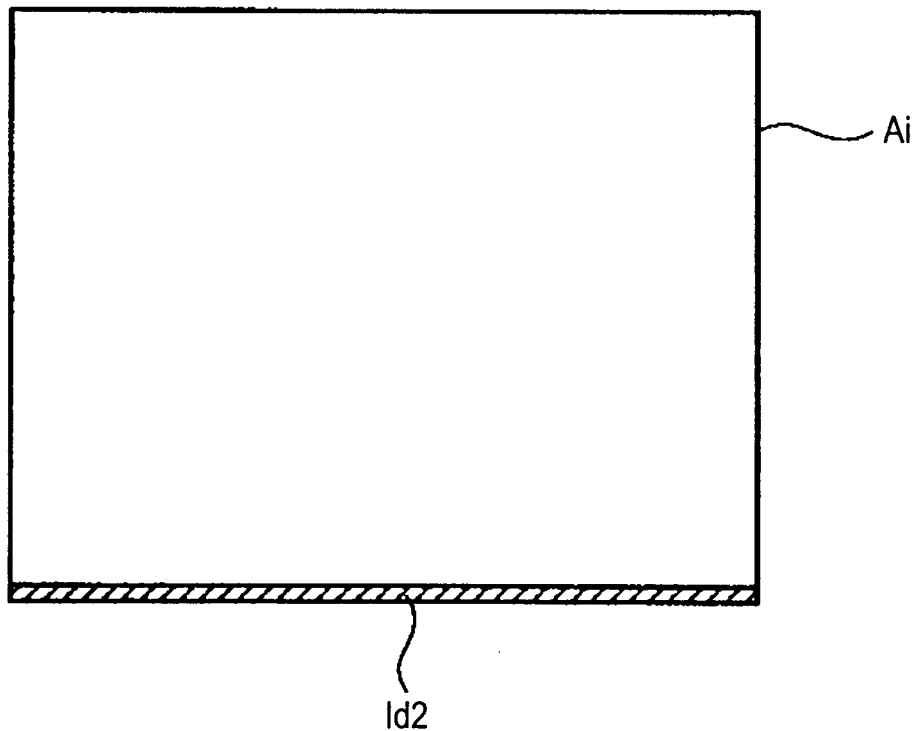
FIG. 10 is a descriptive diagram showing an example in which a bar is displayed as an identifier according to another embodiment of the invention.

The identifier showing that the camera currently under control is selected may be a bar or any other straight line. FIG. 10 shows an example of the identifier of this type. FIG. 10 shows an example in which an identifier Id2 is displayed as a bar along the lower edge of the display screen.

As described above, a video image captured by the camera currently under control may be distinguished from a PGM output video image or a NEXT output video image by displaying an identifier other than a frame on the screen on which the video image captured by the camera currently under control is displayed.

The present application contains subject matter related to that disclosed in Japanese Priority Patent Application JP 2008-283627 filed in the Japan Patent Office on Nov. 4, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing apparatus comprising:
   a plurality of input sections to each of which a video signal outputted from an imaging apparatus whose operation is controllable or a video signal outputted from an apparatus whose operation is not controllable;
   an input selector selecting a video signal representing a primary output or a standby output and/or a video signal inputted from any of the controllable imaging apparatus among the plurality of video signals inputted through the plurality of input sections;
   a screen producer executing processing for producing a plurality of areas by dividing a screen into a plurality of portions in which the video signals selected by the input selector are displayed, the screen producer producing a first color frame for the area among the areas in which the video signal selected by the input selector as the video signal representing the primary output is displayed, producing a second color frame for the area in which the video signal selected by the input selector as the video signal representing the standby output is displayed, and producing a third color identifier for the area in which the video signal inputted from the controllable imaging apparatus is displayed, the third color different from the first and second colors;
   an output section outputting the video signals and the frames the identifier processed in the screen producer to a display device that displays the screen formed of the plurality of divided areas;
   an operation input unit specifying the video signal selected by the input selector; and
   a control section producing a control signal based on a selection operation performed on the operation input unit,
   wherein the processes in the input selector and the screen producer are carried out based on the control signal produced by the control section,
   wherein the operation input unit includes primary output selection buttons for selecting the video signal representing the primary output, standby output selection buttons for selecting the video signal representing the standby output, and camera selection buttons for selecting the video signal inputted from the controllable imaging apparatus, and
   the control section produces a control signal for controlling the input selector and the screen producer based on information contained in a table that relates the following parameters to one another in a one-to-one relationship: logical numbers assigned to the buttons in such a way that the corresponding ones of the three types of buttons have the same number, input port numbers assigned to the plurality of input sections, camera numbers assigned to the controllable imaging apparatus, and display position numbers assigned to the plurality of areas.

2. The video signal processing apparatus according to claim 1,
   wherein the third color identifier produced by the screen producer is a frame.

3. The video signal processing apparatus according to claim 2,
   wherein when the video signal inputted from the controllable imaging apparatus and selected by the input selector is the video signal selected also as the primary output or the standby output, the screen producer places the third color frame inside the first or second color frame.

4. The video signal processing apparatus according to claim 1,
   wherein the third color identifier produced by the screen producer is a marker.

5. The video signal processing apparatus according to claim 1,
   wherein the third color identifier produced by the screen producer is a bar.

6. A video signal processing method comprising the steps of:
   inputting a video signal outputted from an imaging apparatus whose operation is controllable or a video signal outputted from an apparatus whose operation is not controllable;
   selecting a video signal representing a primary output or a standby output and/or a video signal inputted from any of the controllable imaging apparatus among the plurality of video signals inputted in the inputting step;
   displaying the video signals selected in the input selecting step in areas obtained by dividing a screen into a plurality of portions, producing a first color frame for the area among the areas in which the video signal selected in the input selecting step as the video signal representing the primary output is displayed, producing a second color frame for the area in which the video signal selected in the input selecting step as the video signal representing the standby output is displayed, and producing a third color identifier for the area in which the video signal inputted from the controllable imaging apparatus is displayed, the third color different from the first and second colors;
   outputting the video signals and the frames or the identifier processed in the producing step to a display device that displays the screen formed of the plurality of divided areas;
   specifying the video signal selected by the selecting step; and
   producing a control signal used on a selection operation perfouiied during the specifying step,
   wherein the processes in the selecting step and the displaying step are carried out based on the control signal produced by the producing step,
   wherein the specifying step is executed through a primary output selection button for selecting the video signal representing the primary output, a standby output selection button for selecting the video signal representing the standby output, and a camera selection button for selecting the video signal inputted from the controllable imaging apparatus, and
   wherein the producing step produces a control signal for controlling the selecting step and the displaying step based on information contained in a table that relates the following parameters to one another in a one-to-one relationship: logical numbers assigned to the buttons in such a way that the corresponding ones of the three types of buttons have the same number, input port numbers assigned to the plurality of input sections, camera numbers assigned to the controllable imaging apparatus, and display position numbers assigned to the plurality of areas.

\* \* \* \* \*